United States Patent [19]

Hicks et al.

[11] Patent Number: 4,590,790
[45] Date of Patent: May 27, 1986

[54] METHOD FOR DETERMINING THE ACCURACY OF A GAS MEASUREMENT INSTRUMENT

[75] Inventors: Irwin A. Hicks, Radnor; Robert S. Jacobsen, Hatboro; David F. Kee, Glenside; George W. Schneider, Jr., Huntingdon Valley, all of Pa.

[73] Assignee: American Meter Company, Philadelphia, Pa.

[21] Appl. No.: 734,934

[22] Filed: May 16, 1985

[51] Int. Cl.$^4$ .............................................. G01F 25/00
[52] U.S. Cl. ........................................... 73/3; 73/202
[58] Field of Search .................... 73/3, 202, 861.63

[56] References Cited

U.S. PATENT DOCUMENTS 749,645 1/1904 Tuttle ..................................... 73/202
4,432,230 2/1984 Stahler et al. ........................ 73/3 X Primary Examiner—Jerry W. Myracle
Attorney, Agent, or Firm—David L. Davis; Robert E. Smith; Edward L. Bell

[57] ABSTRACT

A meter in a high pressure gas pipeline is calibrating using a sonic nozzle in series with the meter. A bypass line is run where measurements are made to determine gas composition dependent factors for use in defining the flow through the nozzle.

1 Claim, 1 Drawing Figure

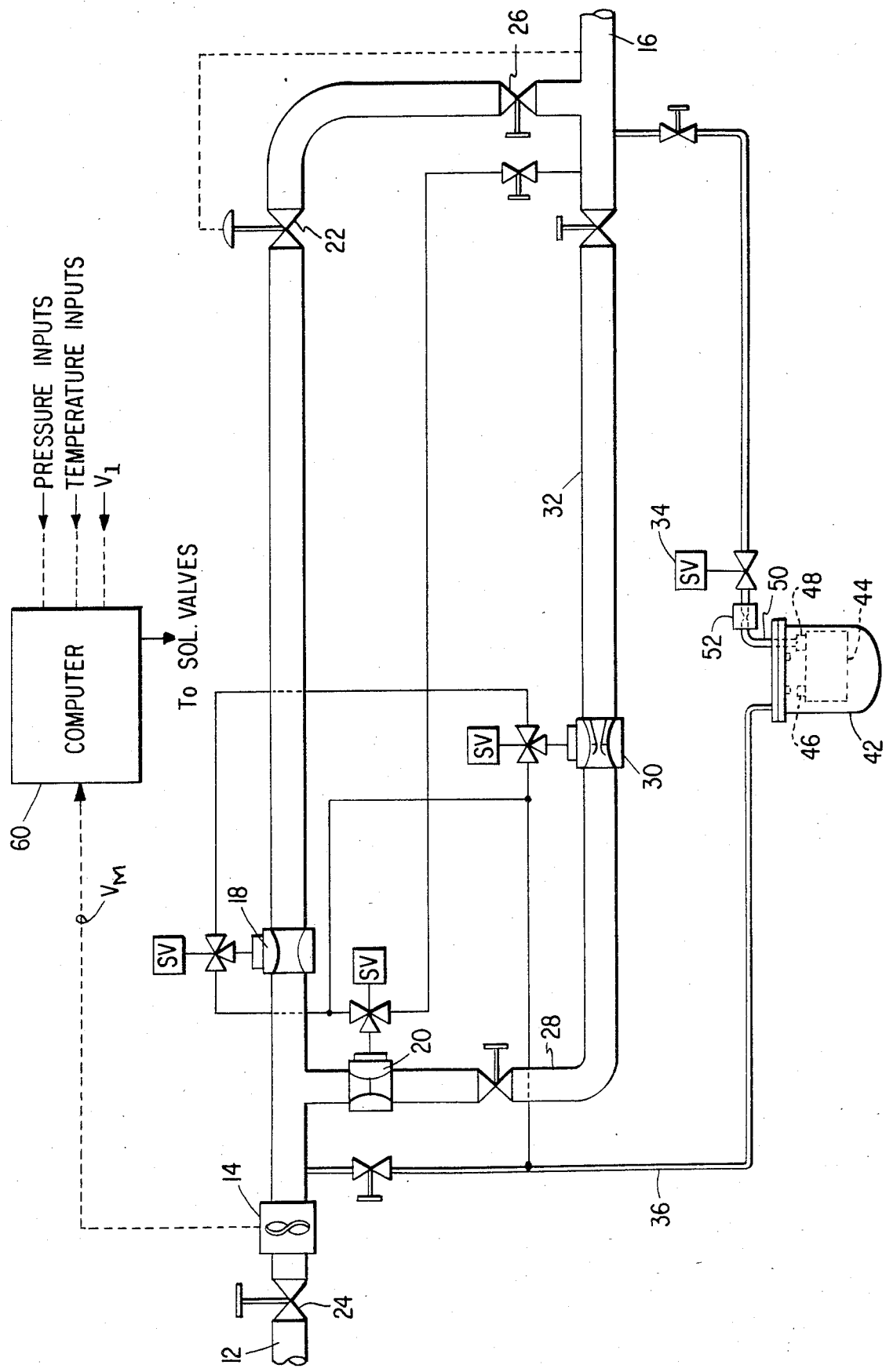

METHOD FOR DETERMINING THE ACCURACY OF A GAS MEASUREMENT INSTRUMENT

BACKGROUND OF THE INVENTION

This invention relates to gas flow measurement and, more particularly, to the determination of the accuracy of a gas measurement instrument in a high pressure pipeline.

In co-pending application Ser. No. 734,937 filed on even date herewith, there is disclosed an arrangement for mounting a sonic nozzle in a gas pipeline for on-site calibration of a gas meter. When using that arrangement, since the gas velocity through the sonic nozzle is constant, knowing that velocity, the throat area of the nozzle, and the time during which gas flow is measured by the meter, a comparison may be made between the actual volume flow and the volume flow measured by the meter in order to determine the accuracy of the meter. The difficulty with this approach is in determining the velocity of the gas through the throat of the nozzle under sonic flow conditions. For a perfect gas, the velocity ($v_t$) of the gas through the throat of a sonic nozzle under sonic conditions is $$v_t = \sqrt{kRT_t'} \qquad (1)$$

Where:
k is the ratio of specific heats;
R is the gas composition dependent constant; and
$T_t$ is the throat temperature (°R).

The basic problems with using this equation are that the throat temperature can't be measured and the quantities R and k are gas composition dependent.

SUMMARY OF THE INVENTION

The foregoing and other objects of this invention ae attained in accordance with the principles of this invention by providing a bypass line for the high pressure gas, in which bypass line there is inserted a meter and a small nozzle, the nozzle and meter having been calibrated on a Bell prover. Measurements are made in this bypass line to determine the gas composition dependent factors in the accuracy equation. Since the same gas is present in the bypass line and the main pipeline, these factors, as well as other easily measured quantities, such as temperature and pressure, are utilized to determine the accuracy of the pipeline meter, in series with a larger sonic nozzle.

BRIEF DESCRIPTION OF THE DRAWING

The foregoing will be more readily apparent upon reading the following description in conjunction with the single FIGURE of the drawing which is a schematic illustration of apparatus utilized in performing the present invention.

DETAILED DESCRIPTION

Referring to the drawing, shown therein is a portion of a gate station wherein incoming gas at high pressure in a pipeline 12 has its volume measured by a meter 14 and then has its pressure dropped to a lower outlet pressure for subsequent distribution through a pipeline 16. During normal operation, the valve 18 is open and the valve 20 is closed. Accordingly, the gas in the pipeline 12 passes through the meter 14, through the valve 18, through a pressure regulator valve 22 and into the outlet pipeline 16. The manually operated gate valves 24 and 26 are normally open and are only closed for emergency or maintenance purposes.

When it is desired to calibrate the meter 14, the valve 18 is closed and the valve 20 is opened so that after passing through the meter 14, the gas flows through the pipeline 28, through the sonic nozzle 30, mounted in accordance with the afore-referenced co-pending patent application, and through the pipeline 32 to the pipeline 16. At the same time, the valve 34 is opened, allowing gas to flow through the bypass line 36. The pipeline 36 is fed into a pressure vessel 42, within which there is disposed a meter 44. The inlet 46 of the meter 44 is open to the interior of the pressure vessel 42 and the outlet 48 of the meter 44 exits the pressure vessel 42 through a pipe 50. The gas in the pipe 50 is still at a high pressure. A small sonic nozzle 52, operated at critical flow conditions, controls the volumetric flow rate through the meter 44. There must be sufficient pressre drop to obtain critical flow.

A computer 60 is provided to perform the calculations according to this invention, as will be described in full detail hereinafter. The computer receives as its inputs volume flow information from the meters 14 and 44, as well as pressure and temperature inputs provided by sensors at various points along the gas flow. The computer 60 also controls the operation of the solenoid valve controlled valves 18, 20, 30 and 34.

In accordance with this invention, use is made of the following relationship for gas flow through the sonic nozzle 30, which can be derived from equation (1) under the assumptions that flow is one dimensional through the nozzle 30 (i.e., all fluid properties are uniform over any cross section) and that an isentropic process is involved in flow through the nozzle 30:

$$Q_n = C_d A_t C^* Z_n \sqrt{RT_n} \qquad (2)$$

where:
$Q_n$ is the volume flow rate upstream of the nozzle 30;
$C_d$ is the coefficient of discharge of the nozzle 30, which takes into account the frictional effects generally confined to the boundary layer;
$A_t$ is the area of the throat of the nozzle 30;
$C^*\sqrt{R}$ is a gas composition dependent factor;
$Z_n$ is the supercompressibility factor of the gas flowing into the nozzle 30; and
$T_n$ is the temperature of the gas upstream of the nozzle 30.

The percent accuracy of the meter 14, when all of the gas passing therethrough also passes through the nozzle 30, is given by the following equation:

$$\% \text{ accuracy} = 100 \times \frac{Q_m}{Q_n} = \qquad (3)$$

$$\frac{V_m}{t} \times \frac{P_m}{P_n} \times \frac{T_n}{T_m} \times \frac{Z_n}{Z_m} \times \frac{1}{C_d A_t C^* Z_n \sqrt{RT_n}} \times 100$$

where:
t is the test time;
$V_m$ is the volume indicated by the meter 14;
$P_m T_n Z_n / P_n T_m Z_m$ is the standard gas law correction between the meter 14 and the nozzle 30. The above equation may be reduced to $$\% \text{ accuracy} = 100 \times \frac{Q_m}{Q_n} = \qquad (4)$$

-continued $$\frac{V_m}{t} \times \frac{P_m}{P_n} \times \frac{T_n}{T_m} \times \frac{1}{Z_m} \frac{1}{C_d A_t C^* \sqrt{RT_n}} \times 100.$$

In the foregoing equation (4), the quantities $Q_m$, t, $P_m$, $P_n$, $T_n$ and $T_m$ may be measured and the quantities $Z_m$, $C_d$, $A_t$, and $C^*\sqrt{R}$ must be determined.

The first item that will be determined is the quantity $C^*Z_n\sqrt{R}$. Since the same gas flows through the meter 14 and the nozzle 30 at substantially the same pressure, then $Z_m = Z_n$. Furthermore, this quantity is independent of the size of the nozzle. Accordingly, a small nozzle 52 may be utilized in determining the quantity $C^*Z_n\sqrt{R}$. For that small nozzle 52, equation (2) becomes $$Q_{ns} = C_{ds}A_{ts}C^*Z_n\sqrt{RT_{ns}} = V_1/t_2 \quad (5)$$

where:
$T_{ns}$ is the temperature upstream of the nozzle 52;
$C_{ds}$ is the coefficient of discharge of the nozzle 52;
$A_{ts}$ is the area of the throat of the small nozzle 52;
$V_1$ is the volume measured by the meter 44; and
$t_2$ is the time of the test.

What is measured then is $V_1$, $t_2$ and $T_{ns}$. Accordingly, $$C^*Z_n\sqrt{R} = \frac{V_1}{C_{ds}A_{ts}t_2\sqrt{T_{ns}}} \quad (6)$$

The only unknown in the above equation (6) is the coefficient of discharge-throat area factor $C_{ds}A_{ts}$. This factor is predetermined by using a known gas (preferably nitrogen) at various high pressures into a Bell prover. From the gas laws it is known that $$P_bV_b/T_bZ_b = P_{ns}V_{ns}/T_{ns}Z_{ns} \quad (7)$$

where the subscript "b" refers to the Bell and the subscript "ns" refers to the small nozzle 52 and P, V, T and Z refer to pressure, volume, temperature and supercompressibility, respectively. The volume $V_{ns}$ passing through the nozzle equals the volume flow rate ($Q_{ns}$) times time (t). Thus, it can be shown that:

$$V_{ns} = Q_{ns} \times t = C_{ds}A_{ts}C^*Z_{ns}\sqrt{RT_{ns}} \times t. \quad (8)$$

Therefore, $$\frac{P_bV_b}{T_bZ_b} = \frac{P_{ns}C_{ds}A_{ts}}{T_{ns}Z_{ns}} C^*Z_{ns}\sqrt{RT_{ns}}. \quad (9)$$

Since the gas in the Bell is the same as the gas flowing through the nozzle and they are at the same pressure, $Z_b = Z_{ns}$ and from equation (9), one can derive $$C_{ds}A_{ts} = \frac{V_b}{t} \frac{P_b}{P_{ns}} \frac{T_{ns}}{T_b} \frac{1}{Z_bC^*\sqrt{RT_{ns}}}. \quad (10)$$

Since all the properties of nitrogen are well known and have been well documented in the literature, the quantity $Z_bC^*\sqrt{R}$ is known. Accordingly, since the other quantities on the right side of equation (10) are easily measured, the coefficient of discharge-throat area factor $C_{ds}A_{ts}$ is now determined.

Referring now back to equation (3), it can be assumed that the supercompressibility of the gas at the meter 14 is the same as at the nozzle 30. Therefore, $Z_m = Z_n$ and the percent accuracy equation becomes $$\% \text{ accuracy} = 100 \times \frac{Q_m}{Q_n} = \quad (11)$$

$$\frac{V_m}{t} \times \frac{P_m}{P_n} \times \frac{T_n}{T_m} \times \frac{1}{C_dA_tC^*Z_n\sqrt{RT_n}} \times 100.$$

Substituting in equation (6), the percent accuracy equation then becomes $$\% \text{ accuracy} = 100 \times \frac{Q_m}{Q_n} = \quad (12)$$

$$\frac{V_m}{t} \times \frac{P_m}{P_n} \times \frac{T_n}{T_m} \times \frac{C_{ds}A_{ts}t_2\sqrt{T_{ns}}}{C_dA_t\sqrt{T_n}\,V_1} \times 100.$$

The only terms in equation (12) that may not be known or measured are the coefficient of discharge-throat area factors for the sonic nozzle 30. But for smaller nozzles, these are readily predetermined by the method described above using the Bell prover or other measurement and mathematical techniques for larger size nozzles. Accordingly, the accuracy of the meter 14 may be determined.

There has thus been disclosed an improved method for determining the accuracy of a gas measurement instrument. It is understood that the above-described embodiment is merely illustrative of the application of the principles of this invention. Numerous other arrangements and methods may be devised by those skilled in the art without departing from the spirit and scope of this invention, as defined in the appended claims.

We claim:

1. A method for determining the accuracy of a gas measurement instrument in a high pressure pipeline, comprising the steps of:
   (a) providing a first critical flow device in series with said instrument;
   (b) determining for a second, smaller, critical flow device its coefficient of discharge-throat area factor ($C_{ds}A_{ts}$) using a known gas and a Bell prover where $$C_{ds}A_{ts} = \frac{V_b}{t} \cdot \frac{P_b}{P_{ns}} \frac{T_{ns}}{T_b} \frac{1}{Z_bC^*\sqrt{RT_{ns}}}$$

and $Z_bC^*\sqrt{R}$ is a known quantity for said known gas;
   (c) determining the factor $C_1^*Z_1\sqrt{R_1}$ for the gas in said pipeline by the steps of:
      (c1) providing a bypass line from said pipeline;
      (c2) providing a meter in said bypass line;
      (c3) installing said second critical flow device in said bypass line immediately downstream from said meter;
      (c4) measuring the volume of gas ($V_1$) passing through said meter in a given times ($t_2$); and
      (c5) calculating $$C_1 * Z_1 \sqrt{R_1} = \frac{V_1}{C_{ds} A_{ts} t_2 \sqrt{T_{s2}}} ;$$

(d) measuring the volume ($V_m$) through said instrument during a predetermined time (t) with a meter pressure ($P_m$) and temperature ($T_m$) and a first device pressure ($P_n$) and temperature ($T_n$); and (e) calculating the percent accuracy of said instrument as $$\% \text{ accuracy} = \frac{V_m}{t} \frac{P_m}{P_n} \frac{T_n}{T_m} \frac{C_{ds} A_{ts} t_2 \sqrt{T_{ns}}}{C_d A_t \sqrt{T_n} V_1} \times 100.$$

* * * * *